June 9, 1959  F. BOULET ET AL  2,890,361
PHOTOSENSITIVE STORAGE TUBES
Filed June 5, 1956
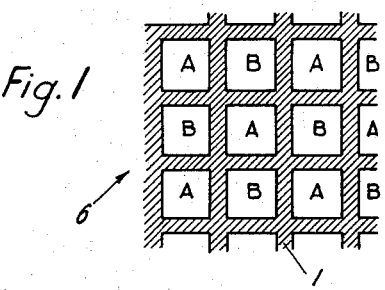
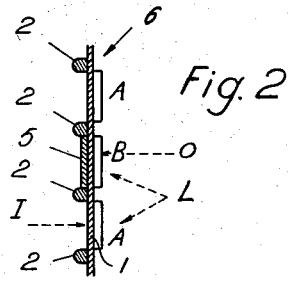
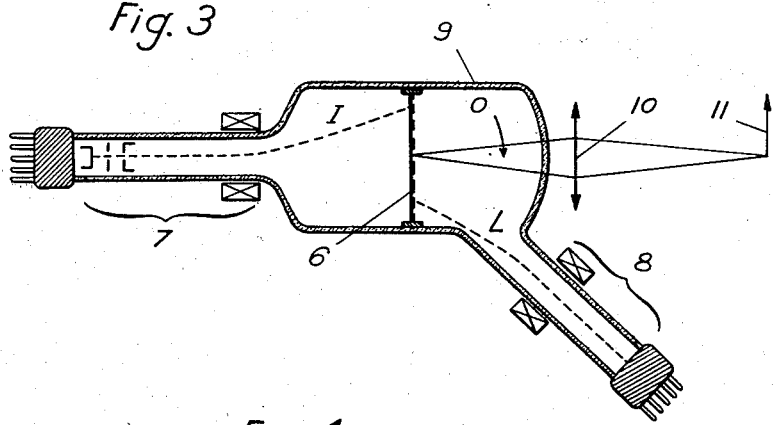
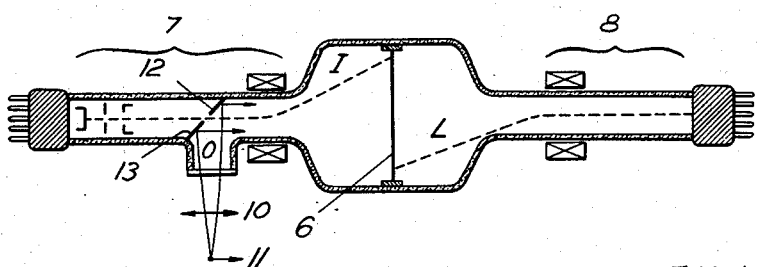
INVENTORS
FRANCOIS BOULET,
CHARLES DUFOUR AND
PIERRE GIRAUD
BY Paul M. Craig Jr.
ATTORNEY.

United States Patent Office 2,890,361
Patented June 9, 1959

2,890,361

PHOTOSENSITIVE STORAGE TUBES

Francois Boulet, Charles Dufour, and Pierre Giraud, Paris, France, assignors to Compagnie Generale de Telegraphie Sans Fil, a corporation of France Application June 5, 1956, Serial No. 589,451

Claims priority, application France July 2, 1955

7 Claims. (Cl. 313—66)

The present invention relates to storage tubes, and more particularly to storage tubes of the induced conductivity type, capable of storing both electronic and optical images, and of restituting them as electric signals.

When transmitting a radar image by television, it may be necessary to obtain simultaneously on the screen of the video receiver-tube both the image of the echo signals collected by the radar and the image of a map, a squared pattern representing co-ordinates, letters or figures for target identification and other various conventional optical symbols, which will be referred to in the following as "objects to be transmitted."

Up to this time, this result was usually obtained by transmitting to the video receiver-tube the video signals, corresponding to the echoes, by means of a storage tube, of the induced conductivity type, and by transmitting "objects to be transmitted," for instance, by means of a television camera.

It is obvious that, with this method, when an object is being transmitted, if the reading scannings of the storage tube and of the camera are not perfectly identical and perfectly synchronized, the relative positions of the "objects to be transmitted" and of the echoes will be modified by the transmission. It is an object of the present invention to avoid this drawback.

The storage tube according to the invention comprises essentially a writing gun, a target which is both photosensitive and capable of storing electronic information by induced conductivity, an optical system for forming in the plane of said target an image of the object to be transmitted, and a gun for reading the images stored on the target.

According to a particular embodiment of the invention, the target is a mosaic of photosensitive elements and of elements of the type comprising a metal layer and an insulating or semiconducting layer and capable of storing information by induced conductivity.

According to a further embodiment the target has photosensitive properties and is capable of storing information through induced conductivity on the whole of its surface. It comprises a metal layer and an insulating layer, separated by an intermediate region of small thickness having semiconducting properties. These two layers are in contact with a supporting metal grid. The intermediate region may be obtained by introducing impurities into a collodion layer applied on this grid, before applying the metal and insulating layers, the collodion layer being thereafter destroyed by thermal treatment.

The invention will be better understood by reference to the ensuing description taken in connection with the appended drawing, wherein:

Figs. 1 and 2 are plan and side views, respectively, of a target portion of a tube according to the invention;

Fig. 3 illustrates a tube including a target of the type shown in Fig. 1;

Fig. 4 shows an alternative embodiment of a photosensitive memory tube according to the invention.

The target 6 according to Figs. 1 and 2 comprises a very thin aluminum foil 1, having a thickness of .05 micron for instance, supported on a copper wire grid 2, having for instance 20 meshes per millimeter. Foil 1 is coated with a mosaic of elements .5 micron thick of two different types A and B alternatively arranged in two directions normal to each other. Elements A are, in the example described, of alumina but could also consist of other insulating substances, such as silica, or of a semiconducting substance, such as zinc sulphide, provided that this substance, whether photosensitive or not, is capable of electronic memory through induced conductivity.

Elements B consist of a photoconductive substance, such as, for instance, selenium or cadmium sulphide, or are photoemissive elements, of the dielectric and caesium-silver type, for instance. They are deposited on portions 5 of foil 1, reinforced by an extra thickness of .05 micron, for instance. It will be assumed that the target 6, shown in Figs. 1 and 2, is submitted to the action of an electronic writing beam I (Fig. 3) on its metallic face, and to an optical writing beam O on its insulated face, the two beams having impact surfaces covering several elements of the target. Assuming that continuity of these elements is sufficient, elements A and B being for instance squares having sides 50 microns long and being separated by strips 10 microns wide, an optical image of the object to be transmitted is under these conditions formed on the elements B of the mosaic. The electric signals to be transmitted are also written by induced conductivity through foil 1, on the mosaic composed of elements A. By reason of the extra thickness of the metal portions 5, electrons do not reach elements B.

Both images thus formed are "read" simultaneously, on the insulated surface of the target, by an electronic reading beam L, the impact surface of which also covers several elements A and B of the target.

Fig. 3 shows a tube comprising a target 6 of the type just described. Electronic writing and reading guns, 7 and 8, are located on either side of the target. The expression "gun" is used here to designate a conventional assembly comprising a cathode, a control electrode, and focusing and deflecting systems for the electronic beam, of the type usually employed in oscillographs, and in storage and television tubes. From outside the glass envelope 9 of the tube, a projector lens 10 supplies an optical image of an object 11 in the plane of the target. For the remainder, the tube and the optical systems, adapted for projecting the optical image on the target and centering the same with respect to the electronic image, are entirely conventional and need not be described in detail. The operation of the tube is similar to that described in connection with Fig. 1. It should be noted that the arrangement of the optical and electron writing systems respectively on each side of the target, and the independence of target elements A and B, makes the above systems completely independent from each other. This feature is of considerable interest, for instance when it is desired to have different remanences for both writings.

In Fig. 4, same references designate similar elements as in Fig. 3. The writing and reading guns, 7 and 8, are respectively located on either side of target 6. The optical transmission system of object 11 comprises a lens 10, a mirror 12 centered on the axis of the tube and inclined by 45° on this axis. The mirror has, in its center an opening 13 for the passage of beam I.

The target 6 in the embodiment of Fig. 4, is of the type described in the copending patent application, Serial No. 587,343, filed on May 25, 1956, by Rigot and Boulet for "Improvements in Targets for Storage Tubes." It comprises, accordingly, a thin aluminum film, about .05 micron thick, for instance, supported on a grid, a semiconducting zone, intermediate the metal film and the grid, and a zinc sulphide coating within the meshes of the grid. The aluminum and zinc sulphide films have been successively applied on the same face of a metal grid, and the transition zone results from impurities introduced into a collodion film applied on the grid to serve as a support for said two coatings and subsequently destroyed by thermal treatment.

It has been established that such a target possesses an excellent sensitivity both for the accelerated electrons between 3000 and 10,000 volts and for the electro-magnetic radiations having a wavelength between 3500 and 4500 A. The optical writing beam O and the electronic writing beam I are projected on the aluminum face of target 6, the aluminum film being sufficiently thin to be transparent both to the electrons and to the optical rays. The reading of the electronic images thus stored is effected on the other side of the target, by means of beam L of fast electrons, which are accelerated at 6000 volts for instance.

For the remainder, the tube in Fig. 4, is entirely conventional one and accordingly is not described in more detail.

Compared to the tube in Fig. 3, the tube represented in Fig. 4 presents the advantage of having axially located guns, thus avoiding any geometrical distortion which might be due to the obliquely disposed guns.

What we claim is:

1. Storage tube for storing both electronic information and optical information and restituting simultaneously both these informations as electrical signals, comprising: a target electrode comprising photosensitive elements and elements capable of electronic memory by induced conductivity; a first electron gun for writing electronic information on said target; an optical system for writing optical information on said target; and a second electron gun for reading the information stored on said target.

2. Storage tube for storing both electronic information and optical information and restituting simultaneously both these informations as electrical signals, comprising: a target electrode which is a mosaic comprising alternate photosensitive elements and elements capable of electronic memory by induced conductivity; a first electron gun for writing electronic information on said target; an optical system for writing optical information on said target; and a second electron gun for reading the information stored on said target.

3. Storage tube for storing both electronic and optical information and restituting simultaneously both as electrical signals, comprising: a target electrode comprising a metallic grid with fine meshes; a thin metallic film supported by said metallic grid, whereby cells are formed by the respective meshes of said grid and said film, and on said film a mosaic comprising alternate photosensitive and insulating elements coextensive with said cells, said insulating elements being capable of electronic memory by induced conductivity, each cell opposite a photosensitive element, on one side of said film, being filled with metal, on the other side of said film; a first electron gun directed toward said meshes for writing electronic information on said insulating elements of the target; an optical system directed toward said mosaic for writing optical information on said photosensitive elements of the target; and a second electron gun directed toward said mosaic for reading the information stored on said target.

4. Storage tube for storing electronic and optical information and restituting simultaneously both, as electrical signals, comprising: a target electrode comprising a metallic grid with fine meshes; a thin metallic film supported by said grid; an insulating film covering said metal film within the meshes of said grid and an intermediate layer having semiconducting properties between said grid and said metal film, whereby said target presents on its whole surface properties of photosensitivity and of electronic memory by induced conductivity; a first electron gun for writing electronic information on said target; an optical system for writing optical information on said target; and a second electron gun for reading information stored on said target.

5. Storage tube according to claim 4, in which said first electron gun and said optical system are at the same side of said target, said second electron gun being at the opposite side thereof.

6. Storage tube according to claim 5, in which said first and second electron guns are co-axial.

7. An electronic storage tube comprising a target electrode, a first electron gun disposed on one side of said target for recording thereupon electronic information, an optical system and a second electron gun both disposed on the other side of said target and adapted respectively for projecting upon said target optical image information to be recorded thereon and for reading all information recorded on said target, said target including a thin metallic film having a first face turned toward said first gun and a second face turned toward said second gun and said optical system, a fine mesh grid for supporting said film on said first face thereof, metal elements filling in alternate meshes so as to form alternately empty and filled meshes, and a mosaic of tiny, insulated elements of substantially the same size as said meshes and disposed on said second face of the film, said elements including elements of electrically resistive material capable of electronic memory by induced conductivity and disposed in register with said empty meshes, and photosensitive elements disposed in register with said filled meshes.

References Cited in the file of this patent

UNITED STATES PATENTS

| | | |
|---|---|---|
| 2,316,550 | Bigalke | Apr. 13, 1943 |
| 2,716,203 | Sen et al. | Aug. 23, 1955 |
| 2,753,552 | Hom | July 3, 1956 |

FOREIGN PATENTS

| | | |
|---|---|---|
| 657,047 | Great Britain | Sept. 12, 1951 |
| 868,879 | France | Oct. 20, 1941 |